United States Patent
Rak et al.

(10) Patent No.: US 11,162,842 B2
(45) Date of Patent: Nov. 2, 2021

(54) OPTICAL SYSTEM FOR SPECTROMETERS

(71) Applicant: Hitachi High-Tech Analytical Science GmbH, Uedem (DE)

(72) Inventors: Marzena Beata Rak, Duisburg (DE); Rainer Simons, Kranenburg (DE)

(73) Assignee: HITACHI HIGH-TECH ANALYTICAL SCIENCE GMBH, Uedem (DE)

( * ) Notice: Subject to any disclaimer, the term of this patent is extended or adjusted under 35 U.S.C. 154(b) by 0 days.

(21) Appl. No.: 17/090,780

(22) Filed: Nov. 5, 2020

(65) Prior Publication Data
US 2021/0131871 A1    May 6, 2021

(30) Foreign Application Priority Data
Nov. 5, 2019   (EP) ..................................... 19207205

(51) Int. Cl.
*G01J 3/28*    (2006.01)
*G01J 3/18*    (2006.01)
*G01J 3/02*    (2006.01)

(52) U.S. Cl.
CPC .................. *G01J 3/28* (2013.01); *G01J 3/021* (2013.01); *G01J 3/18* (2013.01)

(58) Field of Classification Search
CPC ...... G01J 3/28; G01J 3/021; G01J 3/18; G01J 3/20; G01J 3/0254
See application file for complete search history.

(56) References Cited

U.S. PATENT DOCUMENTS

| | | | |
|---|---|---|---|
| 6,614,528 B1* | 9/2003 | Bohle | G01J 3/20 356/328 |
| 10,094,712 B2* | 10/2018 | Neitsch | G01J 3/0286 |
| 2004/0174529 A1* | 9/2004 | Maznev | G01B 11/0666 356/502 |
| 2007/0242268 A1 | 10/2007 | Dobschal et al. | |

(Continued)

FOREIGN PATENT DOCUMENTS

JP    2009092679 A    4/2009

OTHER PUBLICATIONS

Extended European Search Report for Application No. 19207205.6-1020 dated May 13, 2020.

*Primary Examiner* — Maurice C Smith
(74) *Attorney, Agent, or Firm* — Tarolli, Sunheim, Covell & Tummino LLP

(57) ABSTRACT

The invention relates to an optical system, to a spectrometer device comprising such optical system and to a method to operate such an optical system comprising an entrance aperture for entering primary light containing both a first, lower wavelength range and a second, higher wavelength range into said optical system, a grating for spectral dispersion of the primary light beam into a first fan of diffracted light within the first wavelength range and a primary zero order light beam, a mirror element suitably positioned to reflect the primary zero order light beam back as secondary light beam to the grating where it is dispersed into a second fan of diffracted light within the second wavelength range, a detector arrangement with detectors, an absorber element to be reversibly placed within the primary zero order light beam, and a filter element to be reversibly placed within the primary light beam.

14 Claims, 7 Drawing Sheets

(56) References Cited

U.S. PATENT DOCUMENTS

2010/0177308 A1* 7/2010 Bohle ................ G01J 3/1804
356/302
2013/0308129 A1 11/2013 Yamazaki
2017/0102270 A1* 4/2017 Ho ..................... G01J 3/0256

* cited by examiner

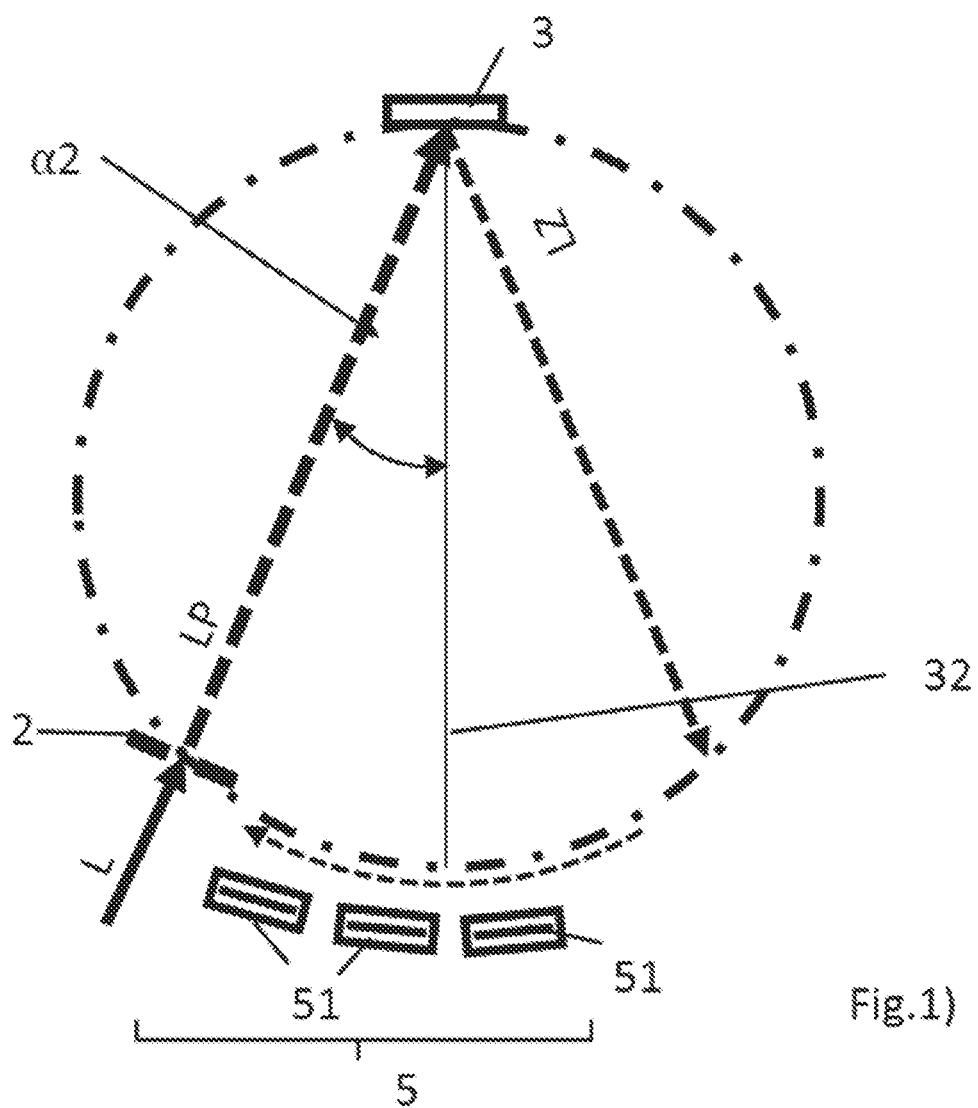
Fig.1)

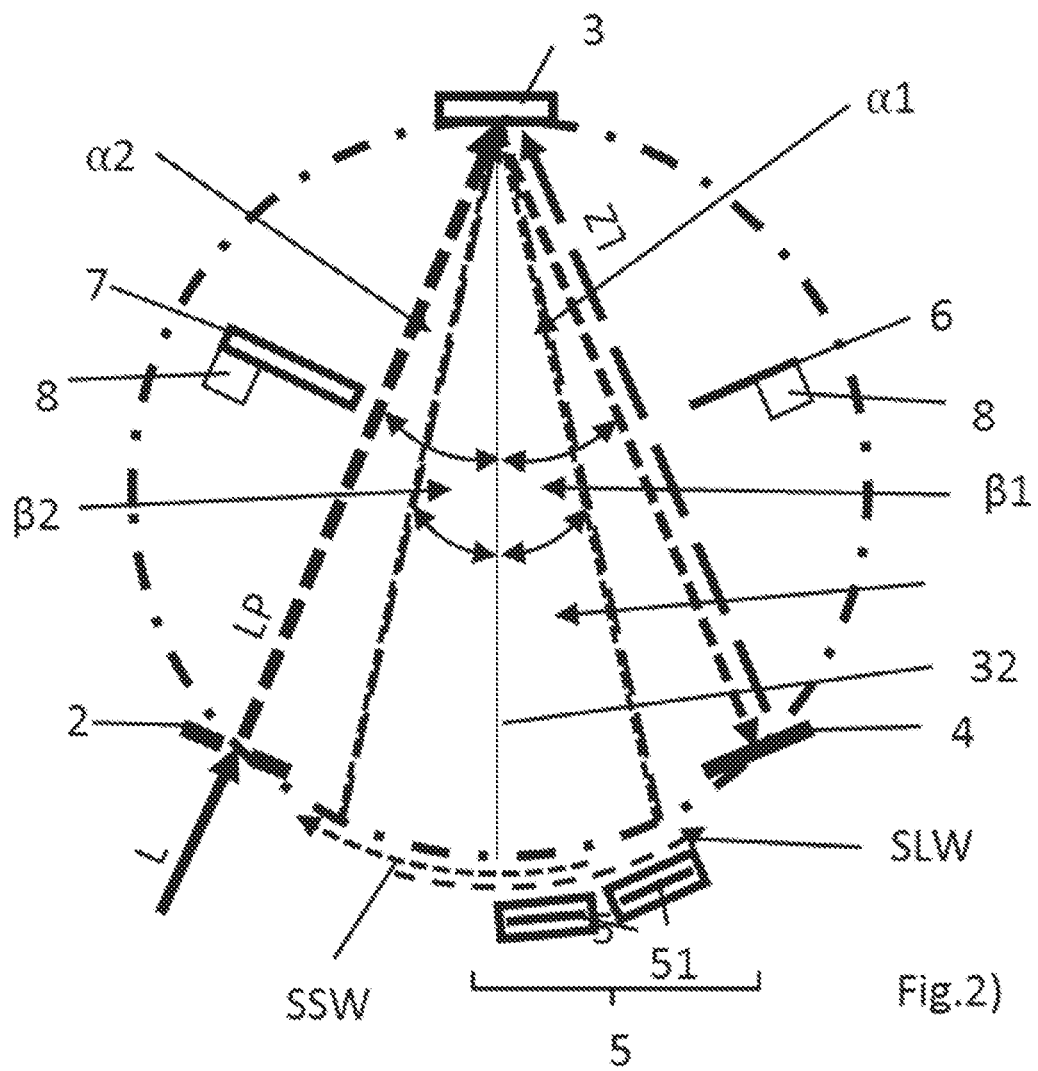
Fig.2)

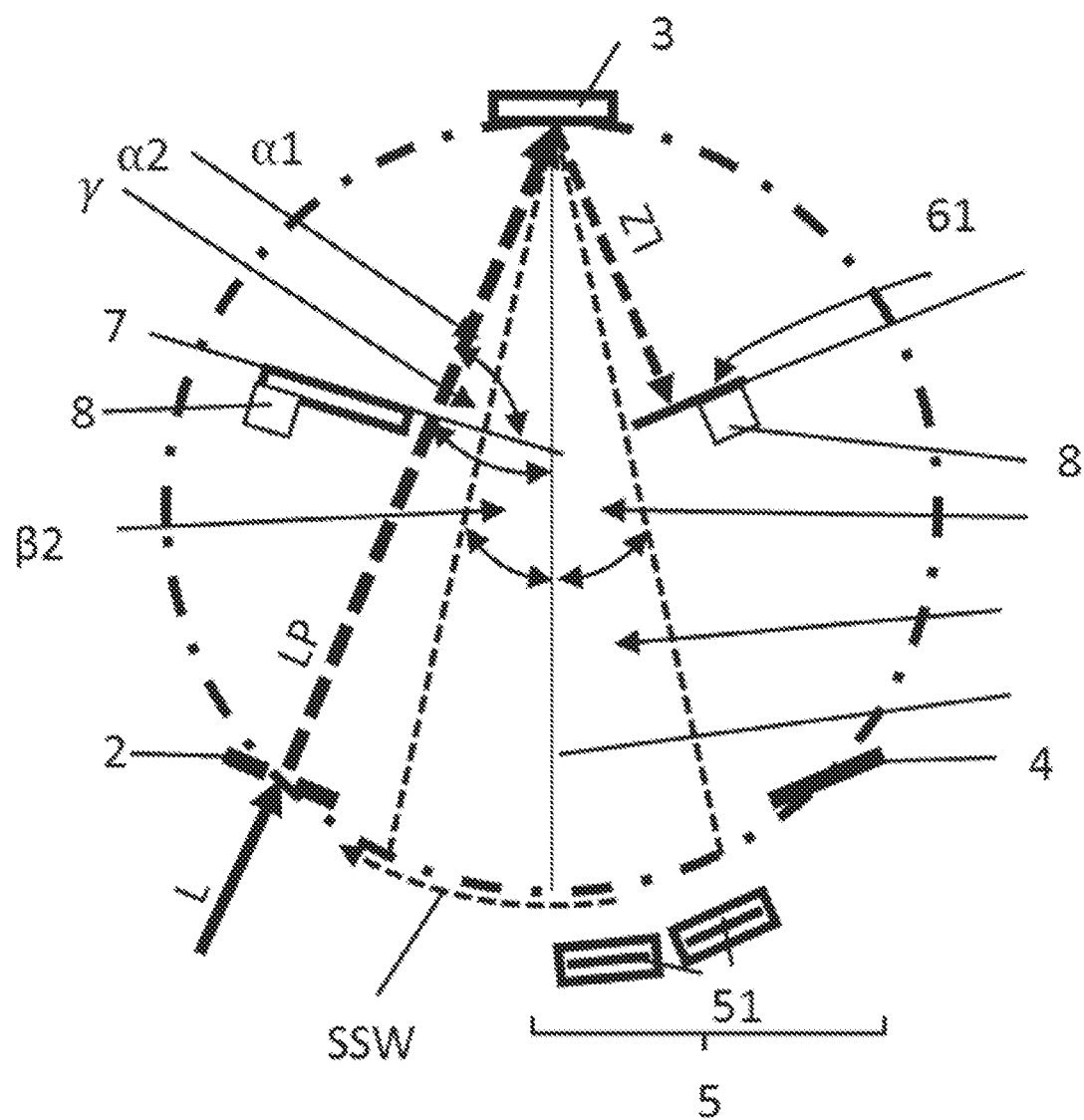
Fig.3)

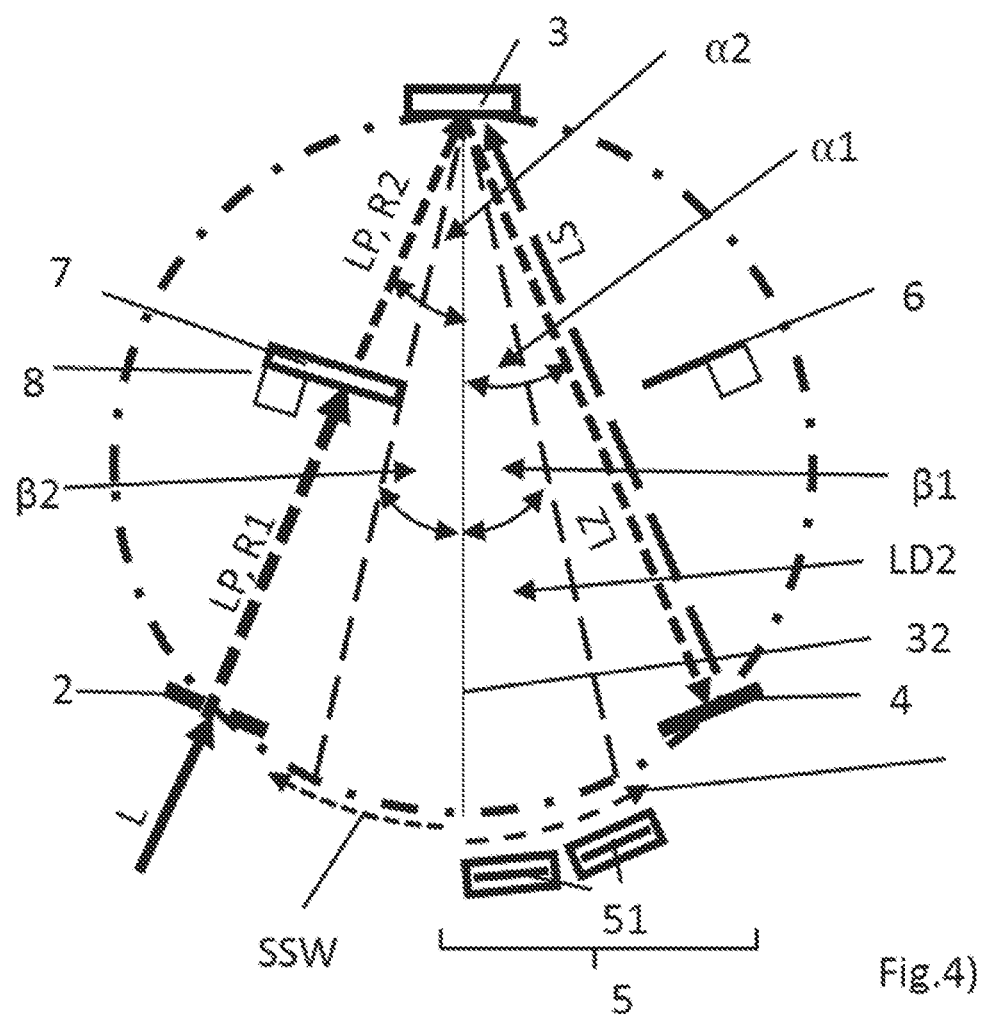
Fig.4)

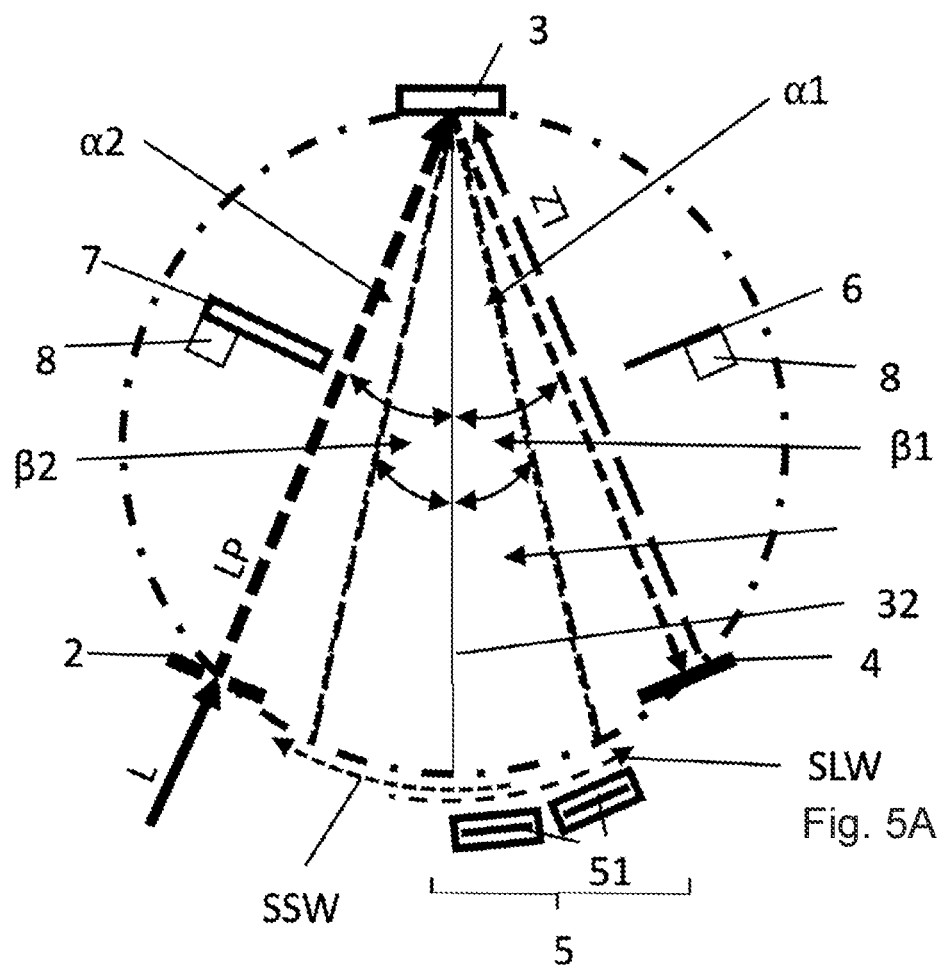

OPTICAL SYSTEM FOR SPECTROMETERS

RELATED APPLICATIONS

The present invention is a Nonprovisional application under 35 USC 111(a), claiming priority to Serial No. EP 19207205.6, filed on 5 Nov. 2019, the entirety of which is incorporated herein by reference.

SUBJECT OF THE INVENTION

The invention relates to an optical system for spectrometers, to a spectrometer device comprising such an optical system and to a method to operate such an optical system.

BACKGROUND OF THE INVENTION

An optical system for spectrometers is a component used to measure properties of light over a specific portion of the electromagnetic spectrum. It is part of a spectrometer device which is used to generate spectral lines by means of arc or spark excitation, LIBS, ICP or glow discharge excitation and the like. The wavelengths and intensities of these spectral lines are measured to identify materials or analyze their chemical composition. Such spectrometer devices may operate over a wide range of wavelengths, from deep UV into far infrared.

A spectrometer device requires an excitation generator for the spectral analysis of a sample, which provides the excitation energy required for the evaporation and ionization of parts of the sample generating a plasma, an optical system which separates the wavelengths of the spectral lines emitted by that plasma, a detector or detector arrangement with which the intensity of those spectral lines can be measured, a readout and control system to record the measured values and control the functions of the spectrometer device, and a computer with software for convenient conversion of the measured values obtained into contents for the individual components of the sample. The spectrometer device must be calibrated before it can be put into operation. Modern spectrometers almost exclusively use diffraction gratings for spectral dispersion. If the grating surface is non-planar, those gratings have imaging capabilities. Shape and spacing of the grating grooves affect these imaging properties. When an optical system is set up in a so called Paschen-Runge mount, the grating is a Rowland grating whose substrate is a concave sphere with the radius of curvature R. Groove shape and spacing are such that the resulting focal curve (=curve in the plane of dispersion of the grating where sharp images of the entrance aperture occur) is a circle of the diameter R called Rowland circle. All components of the optical system like grating, entrance aperture and detector(s) are located on the Rowland circle. The radius from the grating's center of curvature to the center of symmetry of the groove pattern on the surface of the grating (which ideally coincides with the geometrical center of the grating) is called the grating normal line. It is the line of reference for the grating equation against which all angles are measured.

The grating equation $$nG\lambda = \sin \alpha + \sin \beta \quad (1)$$

can be used to determine which wavelength $\lambda$ appears in which order of diffraction n at which angle of diffraction $\beta$, based on the selected angle of incidence $\alpha$ and grating constant G. In a Paschen-Runge mount, the focal curve being a circle is symmetrical around-the normal line. Grating substrates may be non-spherical and groove spacings and shapes may differ from the Rowland type, resulting in non-circular focal curves that may be non-symmetrical around the normal line. This can be the case with so-called flat-field gratings which have focal curves optimized for the use of spatially resolving, linear (array) detectors under certain angles of diffraction. The invention can be applied to some of those systems as well and is not restricted to the Paschen-Runge mount alone. Below, the Paschen Runge mount is used as an example which is easily described to and understood by a person skilled in the art.

The theoretically accessible wavelength range of an optical system always starts at 0 nm for an angle of diffraction $\beta$, wherein the angle of diffraction $\beta$ corresponds to the negative angle of incidence $\alpha$ (see grating equation (1)) and extends up to the threshold wavelength (longest diffracted wavelength) corresponding to an angle of diffraction $\beta$ of 90° in first order of diffraction (n=1). As the substrate also acts as a (spherical) mirror some light will just be reflected under the angle of diffraction $\beta$ corresponding to the negative angle of incidence $\alpha$. This reflection is also called zero order diffraction as it can be derived from the grating equation (1) when setting n=0. Though zero order light contains all wavelengths, their intensity levels are determined by the diffraction efficiency of the grating, straylight loss by the grating and, below the threshold wavelength, the portion of light being diffracted into higher orders. As a rule of thumb, zero order intensities of spectral lines below the threshold wavelength in a Paschen-Runge mount will be $\leq \frac{1}{4}$ of the respective diffracted first order intensities.

In practice, Paschen-Runge optical systems are not built with angles of diffraction $\beta$ ranging from $-\alpha$ to 90° but may be set up from 0° angel of diffraction to almost $\alpha$. That way it will be avoided that spectral lines imaged onto a detector surface are reflected by the grating onto another detector located at the opposite side of the normal line. Also, imaging errors and deviations from the Rowland circle will be small if the value of $\alpha$ is not chosen too big (e.g. $\alpha \leq 30°$). Setting up an optical system that way will however cost either wavelength coverage or spectral resolution as can easily be deduced from the grating equation (1). Different ways to extend the wavelength range and/or spectral resolution of an optical system are known to a person skilled in the art.

Paschen-Runge optics can be operated as single grating systems with one or more entrance apertures (then recording the spectra sequentially) or as dual grating systems having one entrance aperture and using the zero order diffraction from the 1$^{st}$ grating as a light feed for the 2$^{nd}$ grating. Both gratings may but don't have to occupy the same Rowland circle. A variation of this setup consists of a combination of a Rowland grating with a flat-field grating. Multiple grating setups combining the use of the zero order of one grating and multiple entrance apertures located adjacent to each other are also available. Another setup variation uses the zero order by reflecting it back via at least two mirrors onto the same grating at a higher angle of incidence so one grating operates with two different angles of incidence at the same time producing two spectra. The measurement of both spectra might be done simultaneously by appropriate use of filters and a suitable setup of the resulting secondary focal curve. The motivation for all of these setups is the extension of the covered wavelength range and/or a reduction of the number of entrance apertures so as to avoid optical fibers or fiber bundles and shutter mechanisms. Another setup variation has a double entrance aperture, the apertures being around 1 mm apart, with one beam path going directly to one grating whereas the other beam path is being deflected to a second grating (occupying the same Rowland circle) next to the first one. When the two gratings occupy the same Rowland circle the number of detectors can be reduced by sequentially measuring the spectra diffracted from either of the two gratings. By clever choice of the grating constants of the two gratings, the wavelength range is extended without having to use more detectors. Depending on the detector arrangement, wavelength coverage may be compromised as the field of view of the detectors can be optimized for only one line of sight.

However, it would be desirable to use only one entrance aperture and to reduce the number of detectors in order to reduce the equipment costs of a spectrometer. Furthermore, it would be beneficial to have the possibility to attenuate bright parts of the spectrum avoiding saturation without the use of grey filters.

SUMMARY OF THE INVENTION

It is an object of the invention to provide an optical system with only one entrance aperture and a reduced number of detectors without compromising wavelength coverage or spectral resolution. Further it is an object of the invention to provide a spectrometer device using the optical system and a method to operate such an optical system.

The object is solved by an optical system comprising an entrance aperture for entering light to be analyzed forming a primary light beam serving as a primary light feed. The primary light beam contains both a first, lower wavelength range and a second, higher wavelength range, a grating for spectral dispersion of the primary light beam into a first fan of diffracted light within the first wavelength range and a primary zero order light beam, a mirror element suitably positioned to reflect the primary zero order light beam by 180 degrees forming a secondary light beam serving as a secondary light feed to the grating where the secondary light beam is dispersed into a second fan of diffracted light within the second wavelength range, a detector arrangement comprising multiple detectors, an absorber element (or beam shutter) movably mounted to be reversibly placed within the primary zero order light beam between the grating and the mirror element, and a filter element movably mounted to be reversibly placed within the primary light beam between the entrance aperture and the grating, wherein the detector arrangement is adapted to measure the first fan of diffracted light in case of the absorber element being placed within the primary zero order light beam to absorb the primary zero order light and the filter element is positioned outside the primary light beam, and to measure the second fan of diffracted light in case of the filter element is arranged within the primary light beam to filter out the first wavelength range out of the primary light beam and the absorber element is positioned outside the primary zero order light beam.

The wavelength ranges of the first and second fan of diffracted light may directly adjoin each other. In other embodiments there might be a gap between both wavelength ranges.

In state of the art optical systems higher wavelength ranges typically are much more intense than lower wavelength ranges due to transmission losses and the like being wavelength dependent. It is state of the art to adapt the dynamic range of a detector to the intensity of that part of the spectrum which is covered by that detector, e. g. by light attenuating means like grey filters or by light collecting means like spherical mirrors. According to the invention, at least some of the sensors are used to measure light in a lower and in a higher wavelength range sequentially, so considerable intensity differences between these wavelength ranges would make it difficult to adapt the dynamic range of the sensors properly. Thus, in a particularly advantageous implementation of the optical system according to the invention the second fan of diffracted light contains wavelengths below the threshold wavelength. As a result, the intensities of these wavelengths will be inherently attenuated in comparison to the primary light beam which can make other attenuation means dispensable.

The placement of the absorber element (or beam shutter) within the primary zero order light beam and of the filter element within the primary light beam denote a position of the absorber element (or beam shutter) and filter element, where these elements block or filter the respective light.

Measuring the first and second fan of diffracted light denotes measuring the intensity of the light, either originating from the primary light beam or from the secondary light beam, being diffracted by the grating and being received by the detectors.

In a preferred embodiment the detectors are arranged along a circle segment between the normal of the grating and the primary zero order light beam. In this case the first and second wavelength range will not overlap and can be measured sequentially. Thereby the cost and sizes of this optical system can be decreased easily.

It another embodiment the absorber element is a plate made of or coated with ail especially absorbing material to increase the absorbing effect thus to minimize stray light. The absorber element is preferably matt black anodized aluminum. However, it is also possible to use any other metal or plastic material that is plated or coated with an absorbing material, e.g. matt black anodized.

In another embodiment the filter element, when being arranged within the primary light beam, is tilted by a tilting angle γ with respect to the direction of the primary light beam. This avoids any back reflection of the secondary zero order light beam towards the grating when the secondary light feed is used. Thereby spectral contamination of the wavelength range to be measured is prevented.

In a preferred embodiment the filter element is made of a material suitable to filter those wavelengths of the first, lower wavelength range that appear at negative angles of diffraction and would overlap with the second, higher wavelength range. The cut-off wavelength is preferably the wavelength at the normal position β=0 calculated according to equation (1).

In another embodiment the absorber element comprises an electrically or magnetically or pneumatically driven actuator to be moved from a rest position outside the primary zero order light beam to an optically active position or from the active position to the rest position. Thereby the rest position of the absorber element is outside of the primary zero order light beam and the active position is within the primary zero order light beam. With the electrically driven actuator a simple and, above all, precise positioning of the absorber element in its rest position or active position is possible. However, this does not exclude a manual positioning of the absorber element.

In another preferred embodiment the filter element comprises an electrically driven actuator to be moved from a rest position outside the primary light beam to an optically active position within the primary light beam. Further the electrically driven actuator can also move the filter element from the active position to the rest position. With the electrically driven actuator a simple and above all precise positioning of the filter element in its rest position or active position is allowed. However, this does not exclude a manual positioning of the filter element.

In another embodiment the optical system has a plurality of entrance apertures and a corresponding plurality of mirror elements, filter elements and absorber elements.

The object is further solved by a spectrometer device comprising at least one optical system as described above, that additional comprises an operating unit connected at least to the detector arrangement to operate the detector arrangement and to analyze the measured first fan of diffracted light and the second fan of diffracted light.

Furthermore, the object is solved by a method to operate an optical system as described above, comprising an entrance aperture for entering primary light to be analyzed forming a primary light beam serving as a primary light feed, where the primary light beam contains both a first, lower wavelength range and a second, higher wavelength range, a grating for spectral dispersion of the primary light beam into a first fan of diffracted light within the first wavelength range and a primary zero order light beam, a mirror element suitably positioned to reflect the primary zero order light beam by 180 degrees forming a secondary light beam serving as a secondary light feed to the grating where the secondary light beam is dispersed into a second fan of diffracted light within the second wavelength range and a secondary zero order light beam, a detector arrangement comprising multiple detectors, where each of the detectors is adapted to measure the respective parts of the first fan of diffracted light within the first wavelength range and of the second fan of diffracted light within the second wavelength range hitting the detector, comprising the steps of ensuring that a movably mounted filter element is in a rest position outside the primary light beam;

moving a moveably mounted absorber element from a rest position outside the primary zero order light beam to an optically active position within the primary zero order light beam between the grating and the mirror element to absorb the primary zero order light in order to provide only the first fan of diffracted light to the detector arrangement; and measuring the first fan of diffracted light with the detectors of the detector arrangement.

Additionally or alternatively the method is further comprising the steps of:

ensuring that a movably mounted absorber element is in a rest position outside the primary zero order light beam;

moving the filter element from a rest position outside the primary light beam to an optically active position within the primary light beam between the entrance aperture (2) and the grating to filter out the first wavelength range out of the primary light beam in order to provide only the second fan of diffracted light to the detector arrangement; and measuring the second fan of diffracted light with the detectors of the detector arrangement.

It is also possible to measure the second fan of diffracted light first and the first fan of diffracted light second by using the steps described above.

In a preferred embodiment of the method the step of moving the absorber element from its rest position to the optically active position and vice versa and/or the step of moving the filter element from its rest position to the optically active position and vice versa is executed by an electrically or magnetically or pneumatically driven actuators in response to a corresponding control signal. The absorber element and the filter element can be mechanically connected to each other and may then also be moved by only one actuator.

In another embodiment the method comprises an additional step of operating the detector arrangement and analyzing the measured first fan of diffracted light and the second fan of diffracted light by an operating unit connected at least to the detector arrangement.

The above listed embodiments can be used individually or in any combination to provide the device and process according to the invention.

BRIEF DESCRIPTION OF THE DRAWINGS

These and other aspects of the invention are shown in detail in the illustrations as follows.

FIG. 1: schematic view of an optical system according to the prior art;

FIG. 2: schematic view of the optical system according to the present invention;

FIG. 3 schematic view of an embodiment of the optical system according to the present invention when measuring the first fan of diffracted light;

FIG. 4: schematic view of an embodiment of the optical system according to the present invention when measuring the second fan of diffracted light FIG. 5A is an embodiment of the method according to the present invention to operate the optical system with before the measurement.

DETAILED DESCRIPTION OF EMBODIMENTS

Figure 5B:
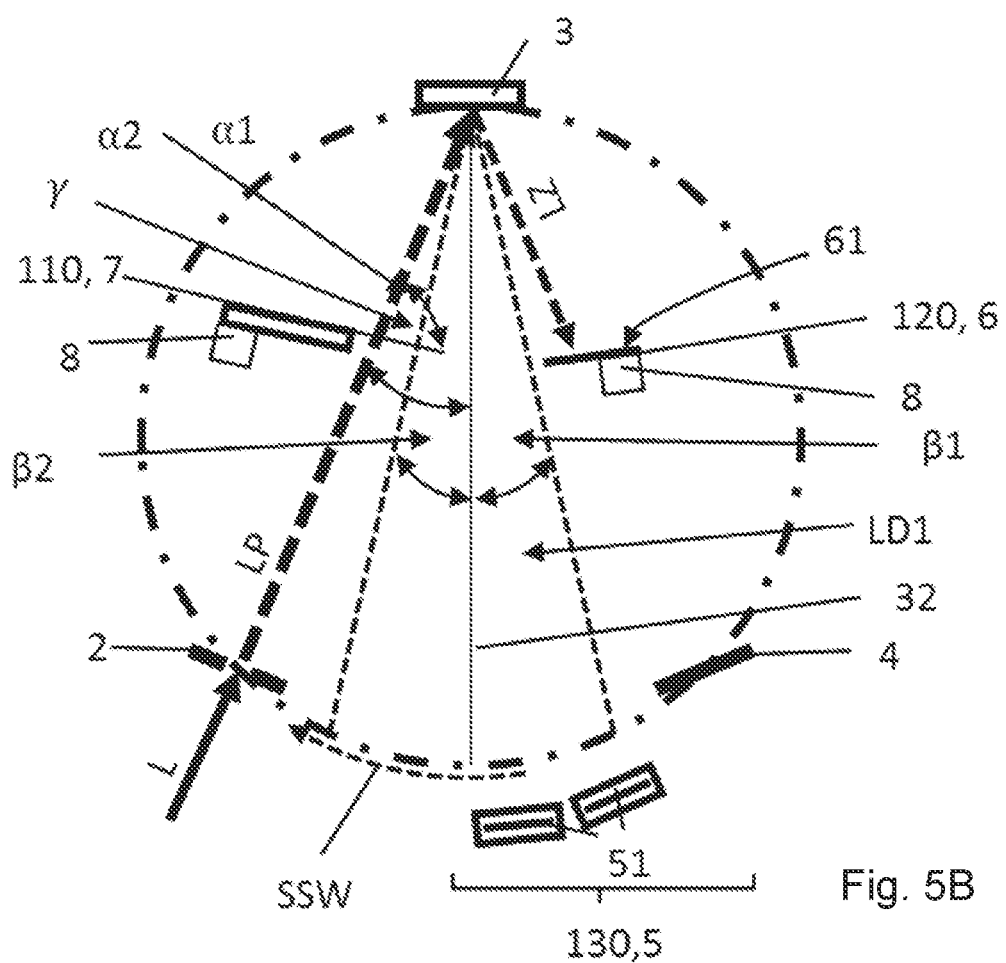
FIG. 5B is an embodiment of the method according to the present invention to operate the optical system with measuring the first fan of diffracted light.

FIG. 1 shows an optical system 1 according to the prior art. In this structure the detectors 51 are arranged along the focal curve on each side of the normal 32 of the grating 3 to simultaneously measure the wavelength ranges R1, R2. In order to gain wavelength coverage and a good resolution a series of detectors are necessary.

FIG. 2 shows the optical system 1 according to the invention with a decreased number of detectors 51 when it is measuring the first fan of diffracted light LD1 as well as the second fan of diffracted light LD2 simultaneously. In this mode the primary light beam LP forms a positive angle of incidence α2 and the back reflection results in a negative angle of incidence α1, each causing the respective angles of diffraction β1, β2 for wavelength λ. Thus two antidirectional spectra are formed which run in opposite directions and partly overlap each other. For the measurement, this overlap is eliminated by decomposing the wavelength ranges into their short wavelength spectral range and their long wavelength spectral range, as explained below.

FIG. 3 and FIG. 4 show an optical system 1 according to the invention with a decreased number of detectors. The optical system comprises an entrance aperture 2 for entering primary light L to be analyzed forming a primary light beam LP serving as a primary light feed, where the primary light beam LP contains a first, lower wavelength range R1 and a second, higher wavelength range R2, a grating 3 for spectral dispersion of the primary light beam LP into a first fan of diffracted light LD1 within the first wavelength range and a primary zero order light beam LZ, a mirror element 4 suitably positioned to reflect the primary zero order light beam LZ by 180 degrees forming a secondary light beam serving as a secondary light feed to the grating 3 where the secondary light beam LS is dispersed into a second fan of diffracted light LD2 within the second wavelength range and a secondary zero order light beam LSZ, a detector arrangement 5 comprising multiple detectors 51, an absorber element 6 movably mounted to be reversibly placed within the primary zero order light beam LZ between the grating 3 and the mirror element 4, and a filter element 7 movably mounted to be reversibly placed within the primary light beam LP between the entrance aperture 2 and the grating 3.

In FIG. 3 the detector arrangement 5 with its detectors 51 positioned on a segment of a circle, which essentially corresponds to the focal curve of the grating 3, between the normal 32 of the grating 3 and the primary zero order light beam LZ, such that the detectors are solely arranged on one side of the normal line 32 of the grating 3. The detectors 51 are adapted to measure and detect the broader range of the first fan of diffracted light LD1, respectively the short-wave spectral range SSW. In order to measure the first fan of diffracted light LD1, respectively the short-wave spectral range SSW, the absorber element 6 must be optically active and is consequently placed within the primary zero order light beam LZ to absorb the primary zero order light LZ, as shown in FIG. 3. While measuring the first fan of diffracted light LD1 the filter element 7 must be inactive and is therefore positioned outside the primary light beam LP.

The absorber element 6 used in this embodiment has a suitable size to fully cover the primary zero order light beam LZ and is a plate coated with an absorbing material, especially aluminum plate that is matt black anodized. However, it is also possible to use a plate made from another absorbing material.

Since the optical system 1 is not only used to measure the first fan of diffracted light beam LD1, but also to measure of the second fan of diffracted light beam LD2 and due to the fact that the absorber element 6 must be adaptable and precisely positioned the absorber element 6 comprises an electrically driven actuator 8. This allows to move the absorber element 8 from a rest position outside the primary zero order light beam LZ to the optically active position within the primary zero order light beam LZ or from the active position to the rest position.

In FIG. 4 the detector arrangement 5 with its detectors 51 is positioned on a segment of a circle, which essentially corresponds to the focal curve of the grating 3, between the normal 32 of the grating 3 and the primary zero order light beam LZ, such that the detectors 51 are solely arranged one side of the normal line 32 of the grating 3. The detectors 51 are adapted to measure and detect a sequence of the second fan of diffracted light LD2, respectively the long-wave spectral range SLW. In order to measure the second fan of diffracted light LD2, respectively the long-wave spectral range SLW, the filter element 7 must be optically active and is consequently arranged within the primary light beam LP to filter out the first wavelength range R1 out of the primary light beam LP. The absorber element 6 is in an optically inactive position while measuring the second fan of diffracted light LD2 and is therefore positioned outside the primary zero order light beam LZ, as shown in FIG. 4.

To measure the second fan of diffracted light LD2 with the detectors 51 the primary order light beam LZ is reflected by the mirror element 4, thus forming the secondary light feed LS, which than is diffracted into the second fan of diffracted light LD2 and a secondary zero order light beam LSZ. To prevent a back reflection of the secondary zero order light beam LSZ by the filter element 7 towards the grating, the filter element 7 is tilted by the tilting angle γ with respect to a direction of the primary light beam LP.

To properly filter out the lower wavelength range R1 the filter element 7 is made of a material suitable to filter those wavelengths of this range that appear at negative angles of diffraction and would overlap with the second, higher wavelength range R2. The cut-off wavelength is preferably the wavelength at the normal position at the angle of diffraction β=0 calculated according to the grating equation (1).

Since the optical system 1 is not only used to measure the second fan of diffracted light beam LD2, but also for the measurement of the first fan of diffracted light beam LD1 and due to the fact that the filter element 7 must be adaptable and precisely positioned the filter element 7 comprises an electrically driven actuator 8. This allows to move the filter element 7 from a rest position outside the primary light beam LP to the optically active position within the primary light beam LP or from the active position to the rest position.

Figure 5C:
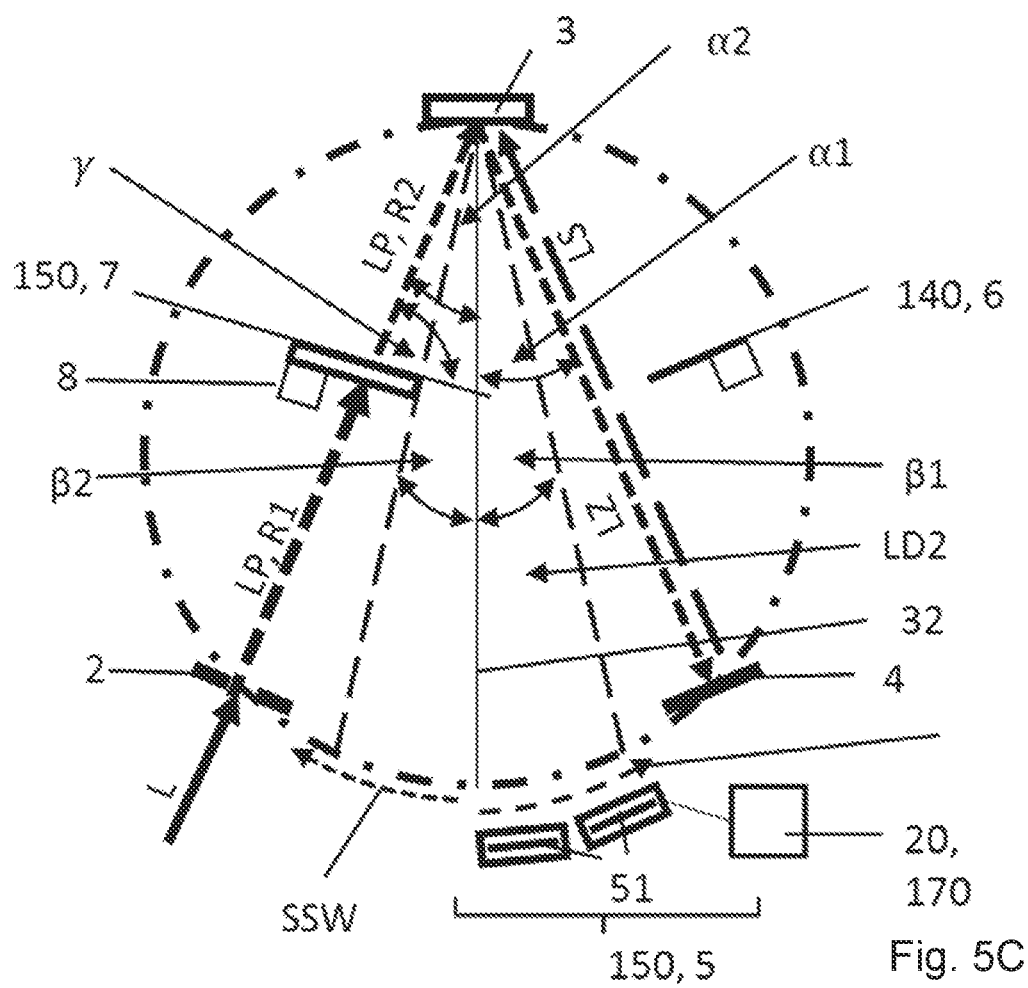
FIG. 5C is an embodiment of the method according to the present invention to operate the optical system with measuring the second fan of the diffracted light.

The FIG. 5A to FIG. 5C show a method to operate the above described optical system 1. To describe the method, it is assumed that the detectors 51 are adapted to sequentially measure the respective parts of the first fan of diffracted light LD1, respectively the short-wave spectral range SSW, within the first wavelength range R1 and of the second fan of diffracted light LD2, respectively the long-wave spectral range SLW, within the second wavelength range R2 hitting the detector. The FIG. 5A shows the condition of light diffraction before the measurements start, wherein the first fan of diffracted light LD1 and the second fan of diffracted light LD2 are superimposing one another, such that the measurement of their respective wavelength range is compromised due to spectral overlap and the measurement in the overlap area would be unprecise. To get precise results with a high resolution and decreased inaccuracies the method comprises the steps (see FIG. 5B):

ensuring 110 that a movably mounted filter element 7 is in a rest position outside the primary light beam LP;

moving 120 a moveably mounted absorber element 6 from a rest position outside the primary zero order light beam LZ to an optically active position within the primary zero order light beam LZ between the grating 3 and the mirror element 4 to absorb the primary zero order light LZ in order to provide only the first fan of diffracted light LD1 to the detector arrangement 5; and measuring 130 the first fan of diffracted light LD1, respectively the short-wave spectral range SSW, with the detectors 51 of the detector arrangement 5.

Additionally or alternatively to measure the second, higher wavelength range R2 of the primary light beam LP the measurement of the first fan of diffracted light LD1 is followed by another measurement, wherein the method comprises the steps (see FIG. 5C):

ensuring 140 that a movably mounted absorber element 7 is in a rest position RP outside the primary zero order light beam LZ;

moving 150 the filter element 7 from a rest position outside the primary light beam LP to an optically active position within the primary light beam LP between the entrance aperture 2 and the grating 3 to filter out the first wavelength range R1 out of the primary light beam LP in order to provide only the second fan of diffracted light LD2 to the detector arrangement 5); and measuring 160 the second fan of diffracted light LD2, respectively the long-wave spectral range SLW, with the detectors 51 of the detector arrangement 5.

The movement of the filter element 7 in step 150 as well as the movement of the absorber element 6 in step 120 is carried out by the electrically driven actuator 8 in response to a corresponding control signal.

Furthermore, the step of operating 170 the detector arrangement 5 and analyzing the measured first fan of diffracted light LD1 and the second fan of diffracted light LD2 by an operating unit 20 connected at least to the detector arrangement 5, as shown in FIG. 5C), is executed after the step 120 and/or 160.

LIST OF REFERENCE NUMERALS

1 Optical system according to the present invention
2 Entrance aperture
3 Grating
32 Normal line of the grating
4 Mirror element
5 Detector arrangement
51 Detectors
6 Absorber element
61 Surface of the absorber element directed towards the grating
7 Filter element
8 (electrically driven) actuator
20 operating unit
100 Method to operate an optical system according to the present invention
110 ensuring that the filter element is in a rest position outside the primary light beam
120 moving the absorber element from a rest position outside the primary zero order light beam to an optically active position within the primary zero order light beam
130 measuring the first fan of diffracted light with the detectors of the detector arrangement
140 ensuring that the absorber element is in a rest position outside the primary zero order light beam
150 moving the filter element from a rest position outside the primary light beam to an optically active position within the primary light beam
160 measuring the second fan of diffracted light with the detectors of the detector arrangement
170 operating the detector arrangement and analyzing the measured first fan of diffracted light and the second fan of diffracted light
$\alpha 1$ negative angle of incidence
$\alpha 2$ positive angle of incidence
$\beta 1$ negative diffraction angle
$\beta 2$ positive diffraction angle
$\gamma$ tilting angle of filter element relative to the primary light beam
L Light from the sample
LD1 First diffracted fan of light
LD2 Second diffracted fan of light
LP Primary light beam
LZ Primary zero order light beam
LS secondary light beam
LSZ Secondary zero order light beam
R1 first wavelength range
R2 second wavelength range
SLW long-wave spectral range
SSW short-wave spectral range

The invention claimed is:

1. An optical system comprising:
an entrance aperture for entering primary light to be analyzed forming a primary light beam serving as a primary light feed, where the primary light beam contains a first, lower wavelength range and a second, higher wavelength range,
a grating for spectral dispersion of the primary light beam into a first fan of diffracted light within the first wavelength range and a primary zero order light beam,
a mirror element suitably positioned to reflect the primary zero order light beam by 180 degrees forming a secondary light beam serving as a secondary light feed to the grating where the secondary light beam is dispersed into a second fan of diffracted light within the second wavelength range and a secondary zero order light beam,
a detector arrangement comprising multiple detectors,
an absorber element movably mounted to be reversibly placed within the primary zero order light beam between the grating and the mirror element, and
a filter element movably mounted to be reversibly placed within the primary light beam between the entrance aperture and the grating,
wherein the detector arrangement is adapted
to measure the first fan of diffracted light in case of the absorber element being placed within the primary zero order light beam to absorb the primary zero order light and the filter element being positioned outside the primary light beam, and
to measure the second fan of diffracted light in case of the filter element being arranged within the primary light beam to filter out the first wavelength range out of the primary light beam and the absorber element being positioned outside the primary zero order light beam.

2. The optical system according to claim 1, wherein the detectors are arranged along a circle segment between the normal of the grating and the primary zero order light beam.

3. The optical system according to claim 1, wherein the absorber element is a plate made of or coated with an absorbing material.

4. The optical system according to claim 3, wherein the absorbing material is matt black anodized aluminum.

5. The optical system according to claim 1, wherein the filter element when being arranged within the primary light beam is tilted by a tilting angle with respect to the direction of the primary light beam.

6. The optical system according to claim 5, wherein the filter element is made of a material suitable to filter-those wavelengths of the lower wavelength range that appear at negative angles of diffraction and would overlap with the second, higher wavelength range.

7. The optical system according to claim 1, wherein the absorber element and the filter element have a suitable size to fully cover the primary zero order light beam and the primary light beam, respectively.

8. The optical system according to claim 1, wherein the absorber element comprises an electrically or magnetically or pneumatically driven actuator to be moved from a rest position outside the primary zero order light beam to an optically active position within the primary zero order light beam or from the active position to the rest position.

9. The optical system according to claim 1, wherein the filter element comprises an electrically driven actuator to be moved from a rest position outside the primary light beam to an optically active position within the primary light beam or from the active position to the rest position.

10. The optical system according claim 1 wherein the optical system has only one entrance aperture.

11. A method to operate an optical system according to claim 1 comprising an entrance aperture for entering primary light to be analyzed forming a primary light beam serving as a primary light feed, where the primary light beam contains both a first, lower wavelength range and a second, higher wavelength range, a grating for spectral dispersion of the primary light beam into a first fan of diffracted light within the first wavelength range and a primary zero order light beam, a mirror element suitably positioned to reflect the primary zero order light beam by 180 degrees forming a secondary light beam serving as a secondary light feed to the grating where the secondary light beam is dispersed into a second fan of diffracted light within the second wavelength range and a secondary zero order light beam, a detector arrangement comprising multiple detectors where each of the detectors is adapted to measure the respective parts of the first fan of diffracted light within the first wavelength range and of the second fan of diffracted light within the second wavelength range hitting the detector, comprising the steps of ensuring that a movably mounted filter element is in a rest position outside the primary light beam;

moving a moveably mounted absorber element from a rest position outside the primary zero order light beam to an optically active position within the primary zero order light beam between the grating and the mirror element to absorb the primary zero order light in order to provide only the first fan of diffracted light to the detector arrangement; and measuring the first fan of diffracted light with the detectors of the detector arrangement;

and/or the method is further comprising the steps of:

ensuring that a movably mounted absorber element is in a rest position outside the primary zero order light beam;

moving the filter element from a rest position outside the primary light beam to an optically active position within the primary light beam between the entrance aperture and the grating to filter out the first wavelength range out of the primary light beam in order to provide only the second fan of diffracted light to the detector arrangement; and measuring the second fan of diffracted light with the detectors of the detector arrangement.

12. The method according to claim 11, where each of the detectors is adapted to measure the respective parts of the first fan of diffracted light within the first wavelength range and of the second fan of diffracted light within the second wavelength range hitting the detector.

13. The method according to claim 11, where the step of moving the absorber element and/or the filter element from the rest position to the optically active position and vice versa is executed by an electrically driven actuator in response to a corresponding control signal.

14. The method according to claim 11, comprising the step of analyzing the measured first fan of diffracted light and the second fan of diffracted light.

* * * * *